Feb. 13, 1934. O. E. HARRIS Re. 19,084
ICE CREAM DIPPER
Original Filed March 6, 1930
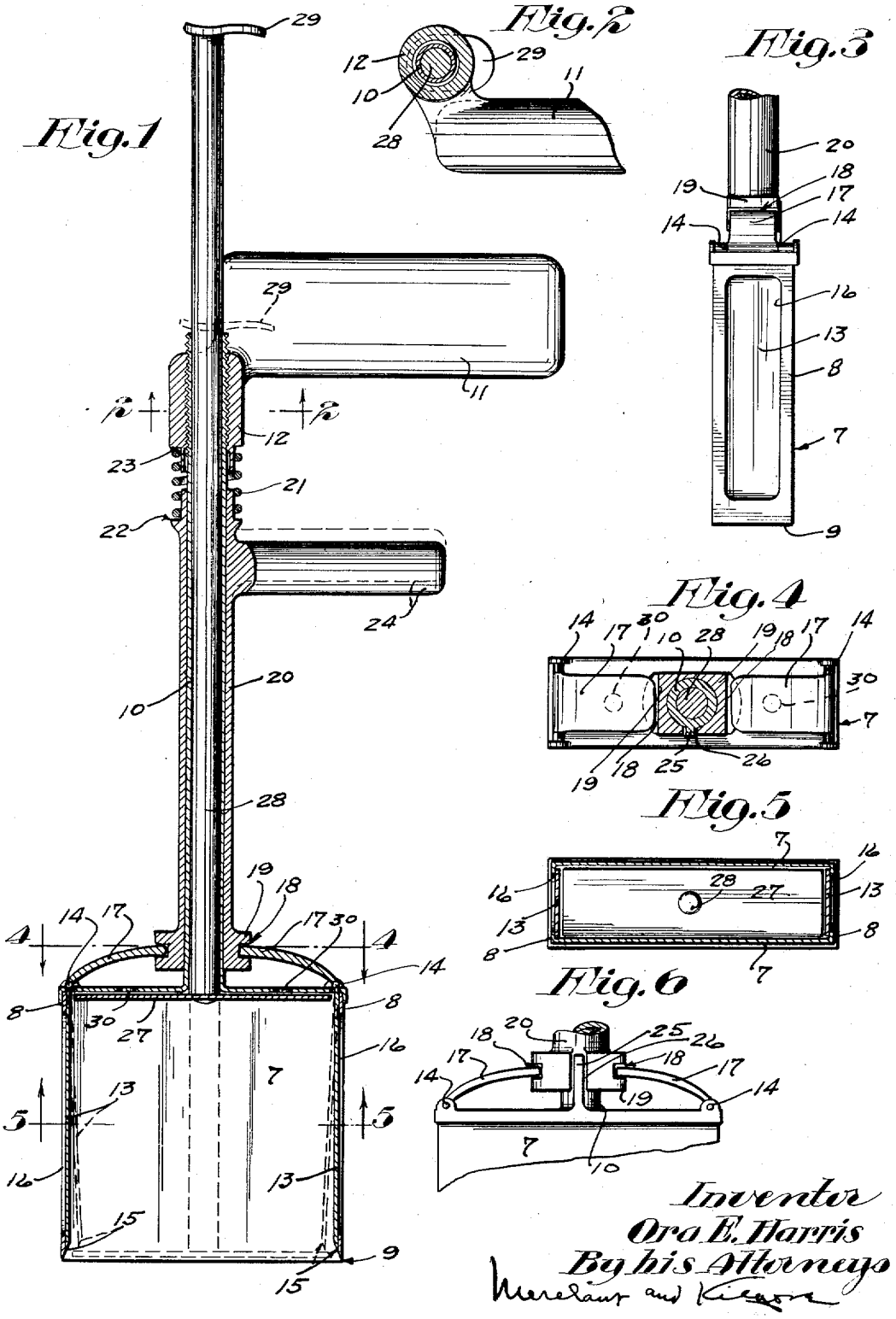

Reissued Feb. 13, 1934

Re. 19,084

UNITED STATES PATENT OFFICE 19,084

ICE CREAM DIPPER

Ora E. Harris, Kearney, Nebr.

Original No. 1,831,386, dated November 10, 1931, Serial No. 433,642, March 6, 1930. Application for reissue September 28, 1933. Serial No. 691,404

7 Claims. (Cl. 107—48)

This invention relates to an ice cream dipper or transferer and has for its object to provide a more profitable and convenient way of dispensing or transferring ice cream in bulk form from a storage container to a dish, ice cream sandwich, "flat cone" and the like, and at the same time make a profitable saving by eliminating heavy shrinkage due to the use of the present type of dipper. This shrinkage is caused by the dipper now commonly used which must be plunged from one to two inches below the surface of the ice cream in order that the ice cream will pack therein with sufficient force to break away from the body thereof and be removed from the dipper. This operation with the dipper to remove a portion of ice cream from the container materially displaces the portion of ice cream in the dipper by packing causing the dispenser to give a customer considerably more ice cream than he pays for. Further shrinkage is also caused, which is a considerable loss to the dispenser, due to the packing of the ice cream by the thrusting and turning of the dipper therein.

By the use of my ice cream dipper excessive loss from shrinkage is eliminated and the manual effort on the part of the dispenser is also materially less.

To the above end, generally stated, the invention consists of the novel devices and combinations of devices, hereinafter described and defined in the claims.

In the accompanying drawing, which illustrates the invention, like characters indicate like parts throughout the several views.

Referring to the drawing:

Fig. 1 is a view of the improved dipper partly in elevation and partly in central longitudinal section;

Fig. 2 is a fragmentary detail view with some parts sectioned on the line 2—2 of Fig. 1;

Fig. 3 is a side elevation of the dipper with the greater portion of the sleeve, stem and ejector rod broken away;

Fig. 4 is a view partly in plan and partly in section taken on the line 4—4 of Fig. 1;

Fig. 5 is a sectional view taken on the line 5—5 of Fig. 1; and

Fig. 6 is a fragmentary view showing the operating connections between the jaws and sleeve.

The dipper 7, as shown, is oblong in cross section and the two narrow sides thereof are designated by the numeral 8. This dipper 7 is relatively deep, has a closed upper end and an open lower end or bottom. In place of making the dipper 7 oblong in shape, as shown, it may be cylindrical, square or of any other suitable and convenient shape.

The lower edge portion of the dipper 7, on the inside thereof, is beveled to an endless sharp cutting edge 9. Rigidly secured to the top of the dipper 7 at the center thereof is an upstanding tubular stem 10 to the upper end of which a horizontal handle 11 is applied. This handle 11 at one end is provided with a depending hub 12 which is attached by screw threads to the upper end of the stem 10. Said handle 11 is laterally offset from its hub 12, see Fig. 2, and extends substantially tangentially therefrom.

A pair of blade-like clamping jaws 13 with the dipper 7 is normally held flat against the inner faces of the dipper sides 8 and are hinged at their upper ends to the top of the dipper 7, as indicated at 14, for swinging movement toward each other into downwardly converging relation, as indicated by broken lines in Fig. 1. The lower edges of the jaws 13 are inwardly beveled to sharp cutting edges 15 which form continuations of the beveled cutting edges 9 so that the dipper 7 and jaws 13 will readily enter the bulk ice cream. These beveled cutting edges 15 perform another important function in that they produce a cam action on the ice cream that holds the jaws 13 open and pressed against the dipper sides 8.

In each dipper side 8 is a large central opening 16 of such size as to leave a relatively narrow endless frame against which the respective jaw 13 closes.

To swing the jaws 13 into converging relation in respect to each other after the dipper has been pressed into bulk ice cream by the handle 11, there is integrally formed with the hinged ends of the jaws 13 a pair of inwardly projecting and upwardly curved relatively wide flat levers 17. The inner ends of the levers 17 extend into a pair of diametrically opposite transverse notches 18 formed in a collar 19 on the lower end of a long sleeve 20 slidably mounted on the stem 10. A coiled spring 21 encircling the stem 10 is compressed between a spring seat 22, formed on the upper end of the sleeve 20, and a spring cap 23 formed on the lower end of the hub 12 and which hub forms a base of resistance for said spring. The tension of the spring 23 is such as to hold the sleeve 20 pressed down with the jaws 13 against the dipper sides 8.

The hub 12 affords a stop for the sleeve 20, limits the lifting movement thereof and hence the closing movements of the jaws 13. By screwing the hub 12 up or down on the stem 10 the width of the gap between the hub 12 and sleeve 20 may be changed, at will, to vary the closing movements of the jaws 13. A radial handle 24 on the upper end of the sleeve 20 which is below the handle 11 affords means by which the sleeve 20 may be lifted against the tension of the spring 21 to actuate the levers 17 and close the jaws 13. The sleeve 20 is held from turning on the stem 10 by a guide lug 25, on the top of the dipper 7 and side of the stem 10 which extends into a relatively deep notch 26 in the collar 19.

To eject a piece of ice cream in the dipper 7, there is provided an ejector comprising a follower plate 27 having a long operating rod 28. This follower plate 27 extends transversely in the dipper 7 with sufficient clearance to work freely therein. The operating rod 28 at its lower end is rigidly secured to the follower plate 27, extends upward through the stem 10 and has on its upper end a thumb-piece 29. Normally the ejector hangs by gravity in its lowermost position with its follower plate 27 at the open bottom of the dipper 7 and thus held by the engagement of the thumb-piece 29 with the upper end of the stem 10, as indicated by broken lines in Fig. 1. In the top of the dipper 7 is a pair of diametrically opposite air holes 30. The offset hand-piece 11 permits free movement of the operating rod 28 thereby to and from the position in which the thumb-piece 29 rests on the upper end of the stem 10.

Normally the dipper 7 is as shown in Fig. 1, with the exception that the ejector is in its dotted line positon. To fill the dipper 7 with ice cream the operator holds the device by its hand-piece 11 and presses the dipper 7 into the ice cream until its top is substantially at the upper surface of the ice cream. As the ice cream fills the dipper 7 the ejector is raised thereby. When the dipper 7 is filled the operator uses certain fingers of the hand by which the hand-piece 11 is gripped to lift the hand-piece 24 against the tension of the spring 21 to close the jaws 13, as indicated by dotted lines in Fig. 1. This closing of the jaws 13 compresses the piece of ice cream in the dipper 7 to a flat wedge which causes the same to break at its narrow end from the main body of ice cream at the bottom of the dipper 7 when said dipper is withdrawn from the body of ice cream. During the filling of the dipper 7 air therein will escape through the holes 30 in advance of the follower plate 27 and piece of ice cream entering said dipper. The closed jaws 13 will hold the piece of ice cream in the dipper 7 after the same has been removed from the body of ice cream in case there is a tendency to slip therefrom.

To eject a piece of ice cream from the dipper 7, the operator releases the hand-piece 24 and with his thumb engages the thumb-piece 29 and presses the same down, while still holding the device by the hand-piece 11, which forces said piece from the dipper 7. In case the jaws 13 adhere to the piece of ice cream in the dipper 7 the downward movement of the follower plate 27 will engage said jaws and positively close the same. The piece of ice cream in the dipper 7 may be discharged by the ejector onto a dish, sandwich, or cone of the proper shape to receive the same.

The apertures 16 permit the jaws 13 and surrounding portions of the dipper 7 to be easily cleansed and they also permit the escape of any ice cream that may be caught between the sides of the dipper 7 and jaws 13. The hand-piece 11 and 24 and the thumb-piece 29 are conveniently arranged so that they may be easily manipulated by one hand.

From the above description it is evident that the dipper 7 may be filled without packing or displacing the ice cream either in the main body thereof or the piece in said dipper.

What I claim is:

1. An open bottom dipper having a hand-piece equipped stem, said dipper having on its lower edge a continuous cutting edge, a jaw movable entirely within the cutting edge and a connection for operating the law to cause the ice cream in the dipper to break flush with the open bottom thereof.

2. An open bottom dipper having a hand-piece equipped stem, and a depending blade-like jaw hinged at its upper end for swinging movement in the dipper and normally closely engaging one side of the dipper, and operating connections for closing the jaw, said dipper being provided with an inwardly beveled cutting edge and said jaw being provided with a correspondingly formed edge which when the jaw is open forms a continuation thereof.

3. A rigid open bottom dipper having a continuous cutting edge and a hand-piece equipped stem, a blade-like jaw depending within the rigid dipper from the upper end thereof and terminating short of the cutting edge, said jaw being mounted for swinging movement inwardly of said cutting edge, a handle-equipped operating sleeve for the jaw slidably mounted on the stem, an operating connection between the jaw and sleeve, and a spring operative on the sleeve to yieldingly hold the jaw open.

4. The structure defined in claim 3, in which the operating connection between the jaw and sleeve is the lever on the jaw extending across the top of the dipper and hingedly connected to the sleeve.

5. The structure defined in claim 2 in which said side of the dipper has an aperture that is closed by the jaw when open.

6. An open bottom dipper having a stem, a handle longitudinally adjustable on the stem, a jaw in the dipper, a sleeve slidably mounted on the stem for operating the jaw, an operating connection between the jaw and sleeve, and a spring compressed between the sleeve and handle on the stem and yieldingly holding the jaw open, said handle on the stem affording a stop for the sleeve to limit the opening movement of the jaw.

7. The structure defined in claim 6 in which the handle on the stem is adjustable longitudinally thereof to limit the opening movement of the jaw.

ORA E. HARRIS.